United States Patent
Serizawa

[19]

[11] Patent Number: 5,898,660
[45] Date of Patent: Apr. 27, 1999

[54] REMOVABLE DISK DRIVE HAVING SHUTTER OPENING/CLOSING MECHANISM

[75] Inventor: Masaaki Serizawa, Tokyo, Japan

[73] Assignee: NEC Corporation, Tokyo, Japan

[21] Appl. No.: 08/766,206

[22] Filed: Dec. 12, 1996

[30] Foreign Application Priority Data

Dec. 15, 1995  [JP]  Japan .................................. 7-326969

[51] Int. Cl.⁶ ............................ G01B 33/02; G01B 5/008
[52] U.S. Cl. .............................................. 369/77.2; 360/96
[58] Field of Search ................................. 369/77.1, 77.2, 369/75.1, 75.2; 360/96.5, 96.6, 85

[56] References Cited

U.S. PATENT DOCUMENTS

| | | | |
|---|---|---|---|
| 4,096,536 | 6/1978 | Cicatelli | 360/96.5 |
| 4,454,599 | 6/1984 | Tsuchiya | 369/77.2 |
| 5,351,228 | 9/1994 | Kanno et al. | 369/77.2 |

FOREIGN PATENT DOCUMENTS

| | | |
|---|---|---|
| 5-205456 | 8/1993 | Japan . |
| 5-234210 | 9/1993 | Japan . |

*Primary Examiner*—Allen T. Cao
*Attorney, Agent, or Firm*—Sughrue, Mion, Zinn, Macpeak & Seas, PLLC

[57] ABSTRACT

It is an object of the present invention to provide a shutter opening/closing mechanism for preventing dust from being introduced into a removable disk drive. The shutter opening/closing mechanism includes a shutter spring for pushing a shutter in a direction of blocking an insert window, a shutter holder which is used for supporting the shutter in such a way that the shutter can be rotated, and which is rotatably provided on a front mask and installed in such a way that a portion thereof for supporting the shutter is rotatable in a direction of departing from the insert window when a cartridge is inserted into the insert window, and a shutter-holder spring for pushing the shutter holder in a direction in which the portion thereof for supporting the shutter approaches the insert window.

6 Claims, 4 Drawing Sheets

REMOVABLE DISK DRIVE HAVING SHUTTER OPENING/CLOSING MECHANISM

BACKGROUND OF THE INVENTION

In general, the present invention relates into a mechanism for opening and closing a shutter for blocking a window for inserting a storage medium employed in a removable storage medium devices such as an optical disk drive. In particular, the present invention relates to a shutter opening/closing mechanism for improving a dust-prevention characteristic.

The shutter opening/closing mechanism of this type is intended for use in preventing dust and foreign material from being introduced into a removable storage medium device from the air.

FIG. 4 is a diagram showing a cross section of a typical conventional shutter opening/closing mechanism which is referred to hereafter as a first conventional example. A shutter 3 is rotatably installed at an insert window of a front mask 5 on the front surface of an optical disk drive. The shutter 3 is pressed against an inner surface of the front mask 5 by a shutter spring 6. In this configuration, the insert window is blocked by the shutter 3 to prevent dust from being introduced into the optical disk drive before a cartridge is inserted thereto.

In addition, disclosed in Japanese Patent Laid-open No. Hei 5-234210 is a technology for blocking an insert window in order to prevent dust from being introduced into a storage device wherein a cartridge load mechanism is used for moving a shutter up and down so that the insert window is blocked before and after a cartridge is inserted into the insert window. This shutter opening/closing mechanism is referred to hereafter as a second conventional example.

Disclosed in Japanese Patent Laid-open No. Hei 5-205456 is a technology wherein, an insert window is opened by pressing a cartridge against a door and the insert window is blocked by the door after the insertion of the cartridge so that dust is prevented from being introduced into the storage device. This shutter opening/closing mechanism is referred to hereafter as a third conventional example.

In the case of the first conventional example, however, even though the insert window is blocked by the shutter 3 before a cartridge 8 is inserted, a portion of the shutter 3 is brought into contact with the cartridge 8 after the cartridge 8 has been inserted as shown in FIG. 5, causing the insert window to be closed incompletely. As a result, dust may be introduced into the storage device by way of a gap between the shutter 3 and the insert window. The introduction of dust gives rise to a problem that the dust is stuck to optical components and a disk, degrading the read/write performance.

In the case of the second conventional example, on the other hand, the configuration thereof is such that the shutter blocks the insert window after a cartridge has been inserted so that the problem with the first conventional example described above is solved. However, a mechanism for moving the shutter up and down is embedded in a load mechanism, giving rise to a problem that the mechanism becomes complex and the work to assemble it becomes difficult. There is also another problem that, in spite of the fact that the power of the load mechanism is limited by the driving power of a motor, the load mechanism can not be driven manually.

In the case of the third conventional example, since the power for opening and closing the shutter does not depend on the load mechanism, the problems with the second conventional example described above are solved. However, a space must be reserved for the locus of the rotating movement of the door, giving rise to a space problem. On top of that, the third conventional example has such a configuration that by pushing the cartridge in a horizontal direction the door is moved away in a slanting direction. In addition, a component of a force for pressing the cartridge toward a rotational shaft exists so that a greater force is required for pressing the cartridge, giving rise to a problem that the user feels a sense of incongruity and an operational problem that the cartridge is difficult to press.

SUMMARY OF THE INVENTION

It is an object of the present invention to provide a shutter opening/closing mechanism having:

a configuration wherein an insert window is blocked even after a cartridge has been inserted;

a simple structure that can be assembled with ease;

a small space of occupancy; and good operability requiring no great force for inserting a cartridge therein.

A removable disk drive provided by the present invention is characterized in that the drive comprises:

a cartridge holder for holding an inserted removable disk cartridge (referred to hereafter as a cartridge) used for accommodating a removable disk for recording information;

a load mechanism capable of moving the cartridge holder in both directions between a position allowing information to be recorded and read into and from the removable disk accommodated in the cartridge and a position allowing the cartridge to be ejected in a horizontal movement;

a front mask having an insert window for inserting the cartridge;

a shutter for blocking the insert window;

first keeping means for pushing the shutter in a direction of blocking the insert window;

a shutter holder which is used for supporting the shutter in such a way that the shutter can be rotated, rotatably provided on the front mask and installed in such a way that a portion thereof for supporting the shutter is rotatable in a direction of departing from the insert window when the cartridge is inserted into the insert window; and second keeping means for pushing the shutter holder in a direction in which the portion thereof for supporting the shutter approaches the insert window.

According to one aspect of the removable disk drive provided by the present invention:

the shutter holder thereof comprises a first member for rotatably supporting the shutter at one end thereof and a second member;

the other end of the first member and one end of the second member form a common portion;

the common portion is rotatably supported by the front mask; and the first and second members form an angle of smaller than 180 degrees.

According to another aspect of the removable disk drive provided by the present invention, after a cartridge is inserted into the removable disk drive and pressed downward by the load mechanism at the position allowing information to be recorded and read into and from the removable disk accommodated in the cartridge, the portion of the shutter holder supporting the shutter approaches the insert window, putting the shutter in a state of blocking the insert window.

According to a still further aspect of the removable disk drive provided by the present invention, in order to eject a cartridge, the load mechanism pushes up the cartridge in a vertical direction and presses the shutter holder by the cartridge so that the portion of the shutter holder supporting the shutter is rotated in a direction of departing from the insert window, opening the insert window.

According to still another aspect of the removable disk drive provided by the present invention, as the cartridge is completely ejected out from the insert window, the portion of the shutter holder supporting the shutter approaches the insert window, putting the shutter in a state of blocking the insert window.

BRIEF DESCRIPTION OF THE DRAWINGS

The novel features and believed characteristics of the present invention are set forth in the appended claims. The present invention itself, however, as well as other features and advantages thereof will be best understood by reference to the detailed description, which follows, when read in conjunction with accompanying diagrams wherein:

DETAILED DESCRIPTION OF THE PREFERRED EMBODIMENTS

The present invention will become more apparent from the following detailed description of some preferred embodiments with reference to the accompanying diagrams showing the embodiments.

Figure 1:
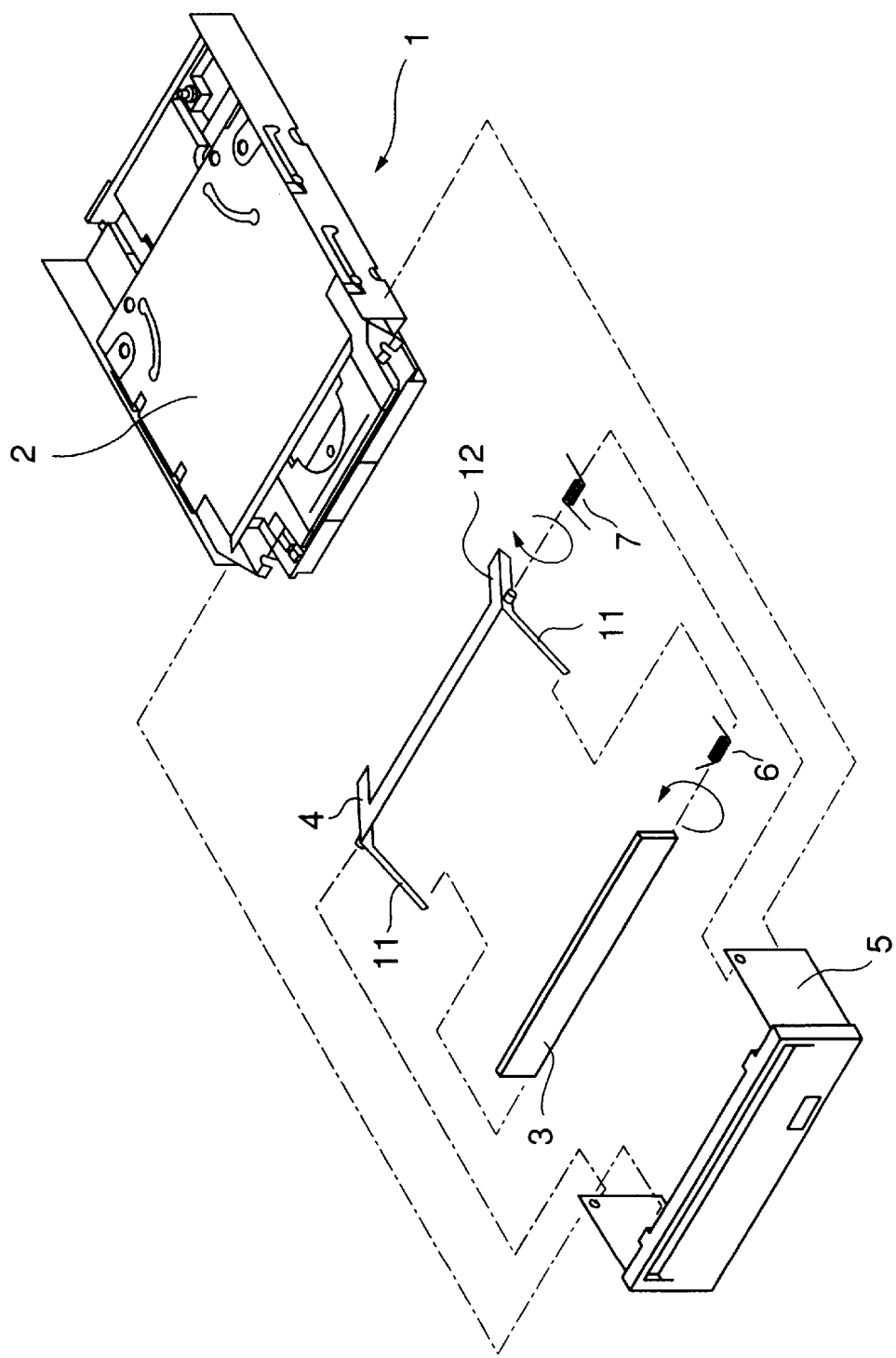
FIG. 1 is a diagram showing a view of a disassembled configuration of a shutter opening/closing mechanism provided by the present invention.

FIG. 1 is a diagram showing a view of a disassembled configuration of a shutter opening/closing mechanism provided by an embodiment of the present invention. A load mechanism 1 shown in the figure has a function to move up and down a cartridge holder 2 for holding a cartridge 8 which is not shown in the figure. A front mask 5 is fixed on the front surface of an optical disk drive. A shutter holder 4 comprises a first member 11 and a second member 12. A shutter 3 for blocking an insert window provided on the front mask 5 is rotatably engaged with one end of the first member 11 of the shutter holder 4. In the shutter holder 4, the other end of the first member 11 and one end of the second member 12 form a common portion which is rotatably supported by the front mask 5. The first and second members 11 and 12 form a V character turned upside down with an angle of smaller than 180 degrees facing downward. A shutter spring 6 is installed to push the shutter 3 in a direction indicated by an arrow in the figure. By the same token, a shutter-holder spring 7 is installed to push the shutter holder 4 in a direction indicated by an arrow in the figure.

Next, operations to insert a cartridge 8 are explained by referring to FIG. 2. FIGS. 2A to 2D are diagrams showing side transparent views of the shutter opening/closing mechanism.

Figure 2A:
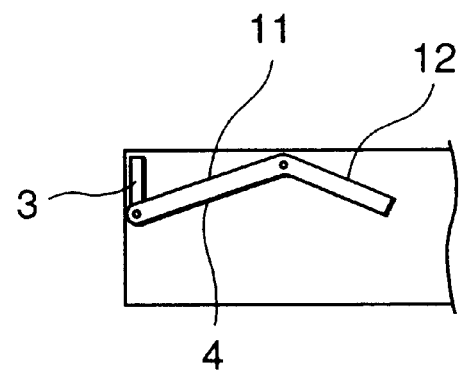
FIG. 2A is a diagram showing an initial state prior to insertion of a cartridge.

FIG. 2A is a diagram showing an initial state prior to insertion of the cartridge 8. The shutter 3 and the shutter holder 4 are forcibly kept in a state shown in the figure by the shutter spring 6 and the shutter-holder spring 7 respectively which are not shown in the figure.

Figure 2B:
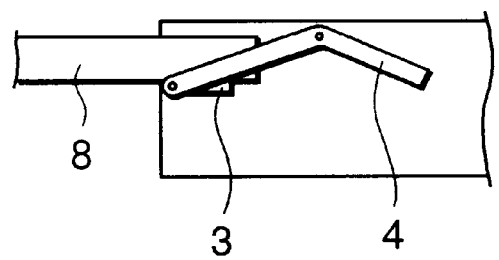
FIG. 2B is a diagram showing a state in which an operation to insert the cartridge is started.

FIG. 2B is a diagram showing a state in which an operation to insert the cartridge 8 is started. The shutter 3 is rotated to a position shown in the figure by the cartridge which is being inserted. At that time, the cartridge 8 is not in contact with the shutter holder 4.

Figure 2C:
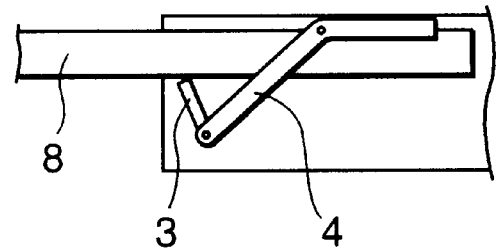
FIG. 2C is a diagram showing a state in which the cartridge has been inserted deeply.

FIG. 2C is a diagram showing a state in which the cartridge 8 has been inserted to a position deeper than the position shown in FIG. 2B. The shutter holder 4 is rotated by the insertion of the cartridge 8 along with the shutter 3, moving the shutter 3 to a waiting position shown in FIG. 2C.

Figure 2D:
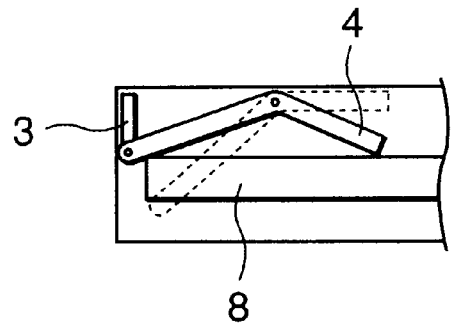
FIG. 2D is a diagram showing a state in which the cartridge has been pressed down to a position allowing information to be recorded and read into and from the cartridge.
Figure 3A:
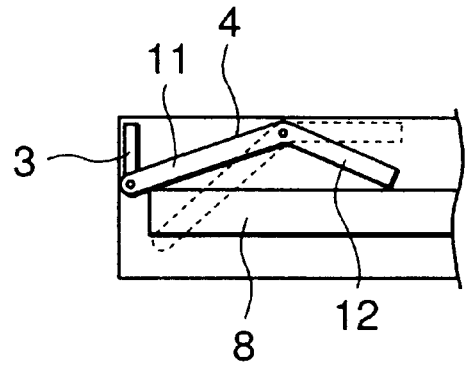
FIG. 3A is a diagram showing a state in which the cartridge is at a position allowing information to be recorded and reproduced into and from the cartridge.
Figure 3B:
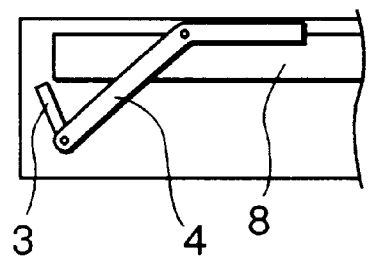
FIG. 3B is a diagram showing a state in which the cartridge has been pushed up in the vertical direction.
Figure 3C:
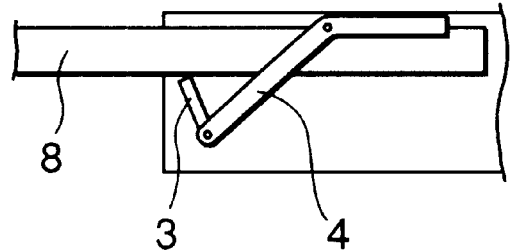
FIG. 3C is a diagram showing a state in which the cartridge is being pulled out in a horizontal movement.
Figure 3D:
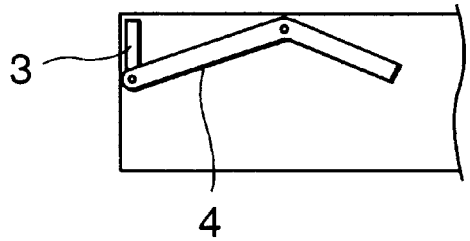
FIG. 3D is a diagram showing a state in which the cartridge has been pulled.
Figure 4:
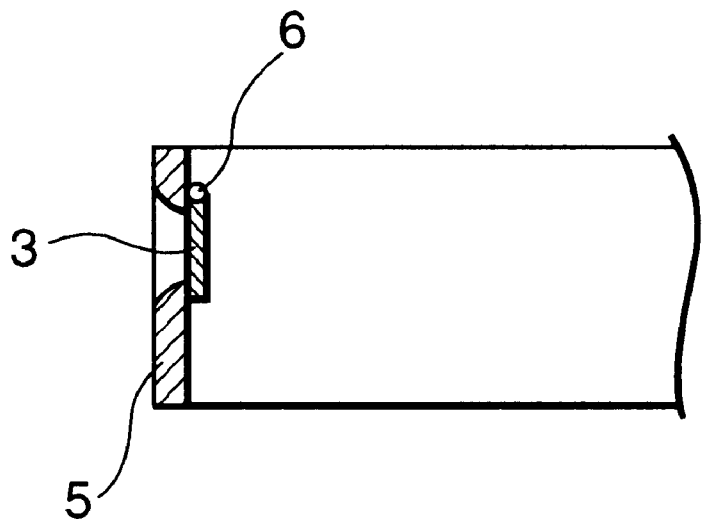
FIG. 4 is a diagram showing a cross section of a conventional shutter opening/closing mechanism prior to insertion of a cartridge.
Figure 5:
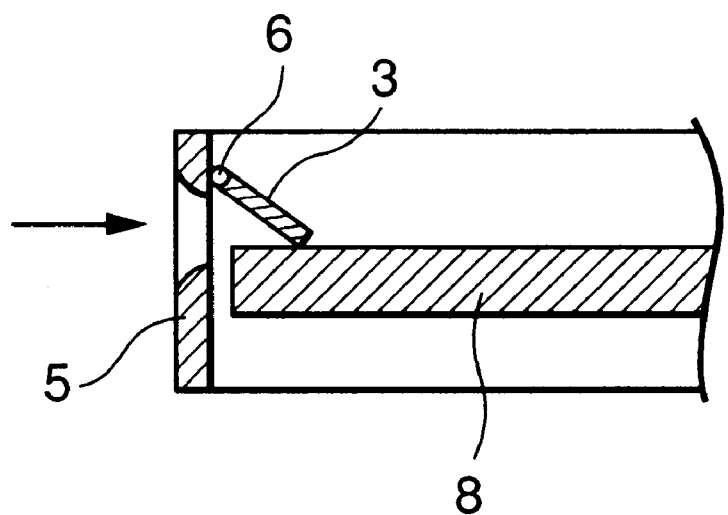
FIG. 5 is a diagram showing a cross section of a conventional shutter opening/closing mechanism after the insertion of the cartridge.

The cartridge 8 is held by the cartridge holder 2, not shown in the figure, and pushed in till the entire cartridge 8 enters the inside of the optical disk drive. The cartridge 8 is then pressed down by the load mechanism 1 not shown in the figure to a position allowing information to be recorded and reproduced into and from the cartridge 8. It should be noted that the timing with which the cartridge 8 enters the inside of the cartridge holder 2 can also be set after the cartridge 8 has been moved in the horizontal direction. At that time, since the cartridge 8 has been pressed down as shown in FIG. 2D, the shutter holder 4 which was pressed by the cartridge 8 is restored to the initial state. In this initial state, the shutter 3 is blocking the insert window.

Next, operations to eject the cartridge 8 are explained by referring to FIG. 3. FIGS. 3A to 3D are diagrams showing side transparent views of the shutter opening/closing mechanism. FIG. 3A is a diagram showing a state in which the cartridge 8 is at a position allowing information to be recorded and reproduced into and from the cartridge 8. When an instruction to eject the cartridge 8 is received in this state, first of all, the load mechanism 1, not shown in the figure, presses up the cartridge in the vertical direction till a state shown in FIG. 3B is reached. The shutter holder 4 is again rotated till the shutter 3 is placed at the waiting position shown in the figure. Thereafter, while the cartridge 8 and the cartridge holder 2, not shown in the figure, are moving in the horizontal direction, and while the cartridge 8 is moving in the horizontal after the cartridge 8 gets off from the cartridge holder 2, the shutter 3 is pressed against the waiting position continuously. Finally, after the cartridge 8 has been pulled out, the shutter 3 is restored to the initial position by the holding force of the shutter-holder spring 7 as shown in FIG. 3D. It should be noted that the timing with which the cartridge 8 is pulled out from the cartridge holder 2 can also be set before the cartridge 8 moves in the horizontal direction.

With the shutter opening/closing mechanism provided by the present invention with the configuration described above, the insert window on the front mask can be blocked before and after a cartridge is inserted.

As described above, the shutter opening/closing mechanism provided by the present invention can block the insert window on the front mask before and after a cartridge is inserted, preventing dust from being introduced from the air and, thus, allowing a dust-proof optical disk drive to be presented.

In addition, it is possible to use only one shutter to block the insert window on the front mask before and after a cartridge is inserted, allowing the number of components to be reduced.

On top of that, since the means for moving the shutter is not embedded in the load mechanism, the configuration is simple, resulting in an effect of easy assembly work.

Another effect exhibited by the shutter opening/closing mechanism is that the power of the load mechanism is not power driven only by the motor but the shutter opening/closing mechanism allows for manual driving.

According to the configuration provided by the present invention, the shutter and the shutter holder move within only a little space around the cartridge. As a result, the shutter opening/closing mechanism can be implemented in even less space. On the top of that, when a cartridge is pressed, a component of a force for pressing the cartridge against the rotational shaft of the shutter does not exist, resulting in an effect of allowing the cartridge to be inserted smoothly.

While the present invention has been described with reference to some illustrative preferred embodiments, this description is not intended to be construed in a limiting sense. A variety of modifications of the illustrative embodiments as well as other embodiments of the present invention will become apparent to persons skilled in the art upon reference to this description. It is therefore contemplated that appended claims will cover any such modifications or embodiments, making them fall within the true scope of the present invention.

What is claimed is:

1. A removable disk drive comprising:

a cartridge holder for holding an insertable removable disk cartridge having a top surface and a bottom surface, said cartridge holder used for accommodating a disk for recording information;

a load mechanism capable of moving said cartridge holder in both directions between a position allowing information to be recorded and read into and from said disk accommodated in said cartridge and a position allowing said cartridge to be ejected in a horizontal movement;

a front mask having an insert window for inserting said cartridge;

a shutter, having two ends, for blocking said insert window;

first keeping means for pushing said shutter in a direction of blocking said insert window;

a shutter holder which is used for supporting one of said two ends of said shutter in such a way that said shutter is rotated, said shutter holder being rotatably provided on said front mask and installed in such a way that a portion thereof for supporting said shutter is rotatable in a direction of departing form said insert window when said cartridge is inserted into said insert window;

wherein another end of said two ends of said shutter is free to rotate when said cartridge is inserted into said insert window and said free end of said shutter contacts with said bottom surface of said cartridge; and second keeping means for pushing said shutter holder in a direction in which said portion thereof for supporting said shutter approaches said insert window.

2. A removable disk drive according to claim 1 wherein said shutter holder thereof comprises a first member for rotatably supporting said shutter at one end thereof and a second member;

the other end of said first member and one end of said second member form a common portion;

said common portion is rotatably supported by said front mask; and said first and second members form an angle of smaller than 180 degrees.

3. A removable disk drive according to claim 2 wherein, after said cartridge is inserted into said removable disk drive and pressed downward by said load mechanism at said position allowing information to be recorded and read into and from said disk accommodated in said cartridge, said portion of said shutter holder supporting said shutter approaches said insert window, putting said shutter in a state of blocking said insert window.

4. A removable disk drive according to claim 2 wherein, in order to eject said cartridge, said load mechanism pushes up said cartridge in a vertical direction and presses said shutter holder by said cartridge so that said portion of said shutter holder supporting said shutter is rotated in a direction of departing from said insert window, opening said insert window.

5. A removable disk drive according to claim 2 wherein, as said cartridge is completely ejected out from said insert window, said portion of said shutter holder supporting said shutter approaches said insert window, putting said shutter in a state of blocking said insert window.

6. A removable disk drive according to claim 2 wherein said shutter opens said insert window during operations to insert and eject said cartridge and blocks said insert window all the time other than during said operations.

* * * * *